United States Patent
Niitsuma

(10) Patent No.: US 9,124,748 B2
(45) Date of Patent: Sep. 1, 2015

(54) IMAGE FORMING APPARATUS RESTRICTING JOB EXECUTION BASED ON UNIT PRICE OF AN ELECTRICITY CHARGE

(71) Applicant: CANON KABUSHIKI KAISHA, Tokyo (JP)

(72) Inventor: Hiroaki Niitsuma, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/072,175

(22) Filed: Nov. 5, 2013

(65) Prior Publication Data

US 2014/0126009 A1    May 8, 2014

(30) Foreign Application Priority Data

Nov. 8, 2012  (JP) ................................. 2012-246062

(51) Int. Cl.
*H04N 1/00*  (2006.01)
*H04N 1/44*  (2006.01)

(52) U.S. Cl.
CPC ....... *H04N 1/00915* (2013.01); *H04N 1/00954* (2013.01); *H04N 1/4433* (2013.01); *H04N 2201/0094* (2013.01)

(58) Field of Classification Search
None
See application file for complete search history.

(56) References Cited

U.S. PATENT DOCUMENTS

| 2002/0140964 | A1* | 10/2002 | Goto et al. | 358/1.14 |
| 2005/0024670 | A1* | 2/2005 | Aoki | 358/1.13 |
| 2011/0213996 | A1* | 9/2011 | Imine et al. | 713/323 |
| 2012/0072376 | A1* | 3/2012 | Akiyama et al. | 705/400 |
| 2013/0057918 | A1* | 3/2013 | Ohta | 358/1.15 |

FOREIGN PATENT DOCUMENTS

JP    2009-47760    3/2009

* cited by examiner

*Primary Examiner* — Hilina K Demeter
(74) *Attorney, Agent, or Firm* — Fitzpatrick, Cella, Harper & Scinto

(57) ABSTRACT

It aims to improve user's convenience by, while keeping a printing electricity charge low by executing a print job under a low electricity charge, executing a print job for a user aiming at certain print job execution without waiting until time of the low electricity charge. In order to do so, an image forming apparatus acquires information related to the electricity charge, and restricts execution of the input print job based on the acquired information. Thus, in case of restricting the execution of the input print job based on the information related to the electricity charge, if the input print job is a first print job configured to be executed on a priority basis, the first print job is executed, and, if the input print job is a second print job not configured to be executed on a priority basis, the execution of the second print job is restricted.

10 Claims, 10 Drawing Sheets

IMAGE FORMING APPARATUS RESTRICTING JOB EXECUTION BASED ON UNIT PRICE OF AN ELECTRICITY CHARGE

BACKGROUND OF THE INVENTION

1. Field of the Invention

The present invention relates to control for restricting an image forming apparatus from executing a print job in accordance with fluctuation of electricity charges.

2. Description of the Related Art

With respect to electricity charges of a commercial power supply provided by an electric power company, there have been conventionally various types of contracts and systems in which a unit price of the electricity charge differs according to periods of time respectively. For example, in one contract, it has been determined that the unit price of the electricity charge is made low in the period of time from midnight to morning during which electric power consumption is low. It should be noted that the above contracts and systems are useful mechanism for controlling electric power demand of customers who actually use the electric power.

Incidentally, the global spread of smart meters which are highly-functional power meters having communication functions and device management functions has been expected in recent years. In the society in which a smart grid being a next-generation power network for efficiently managing and supplying power is achieved, it is conceivable that information of the electricity charges sent from the electric power company is received by the smart meter.

In the above society, it is conceivable to provide, as a method of more flexibly controlling the electric power demand, a mechanism of real-time electricity charges in which the electricity charges of the commercial power supply are changed on a 30-minute basis or a one-hour basis. Verification projects related to the real-time electricity charges have been actually carried out in the several states of the United States of America, and it will be expected to introduce in earnest the mechanism of real-time electricity charges in the future.

As just described, with respect to the electricity charges of the commercial power supply which frequently fluctuate according to the periods of time, if it is possible to control timing for consuming the power of an electronic device to be in the period of time of low electricity charges, then it is possible to lower the necessary electricity charges. Consequently, the above control is desirable for a user who uses the electronic device.

In particular, it should be noted that an image forming apparatus which thermally fixes a toner image formed by an electrophotographic method to a paper greatly consumes power in case of executing image printing on the paper. Consequently, it is conceivable for the image forming apparatus like this to control timing for executing a print job to be in the period of time of low electricity charges.

Incidentally, Japanese Patent Application Laid-Open No. 2009-47760 discloses a technique of previously setting a predetermined allowable electricity charge in regard to electricity charges which frequently fluctuate, and determines whether to execute or wait for a print job by calculating the electricity charge necessary for the print job to be executed and comparing the calculated electricity charge with the predetermined allowable electricity charge.

SUMMARY OF THE INVENTION

In the technique disclosed in Japanese Patent Application Laid-Open No. 2009-47760, it is considered to control the execution of the print job by setting a different allowable electricity charge for each user or each group. However, any means for executing a print job without being restricted by the set allowable electricity charge is not considered.

If some means capable of executing the print job even under the condition that the execution of the print job is restricted based on the setting of the allowable electricity charges is provided, such a situation is seemingly contrary to the object of lowering the necessary electricity charges by controlling the timing for consuming the power of the electronic device to be in the period of time of low electricity charges.

However, in actuality, the electronic devices such as electrophotographic-system large-scale printers, multifunctional machines and the like are often set up for business purposes in such a place as an office rather than an ordinary home. Consequently, if the operation of the electronic device like this is restricted, there is a fear of interfering business because business efficiency is deteriorated and/or printing of necessary business documents cannot be executed swiftly.

Therefore, under the condition of restricting the operation of the electronic device, a case of causing opportunity loss in the business, rather than a case of giving great weight to temporary electricity charges, is resultingly unpreferable for users. Moreover, in addition to the above business viewpoint, a cumbersome problem for the user occurs. More specifically, there is a case where the user has to unwillingly wait for the printing due to autonomous operation restriction of the electronic device although the user has already instructed the electronic device such as the printer, the multifunctional machine or the like to execute the printing. Nevertheless, in such a circumstance that there is a user who does not worry about an electricity charge, there is a case where the electronic device prints a document which is not so important. Consequently, it is also true that it is important for the electronic device to have a mechanism of autonomously restricting execution of the print job.

The present invention has been completed in consideration of the above problems, and an object thereof is to provide a mechanism of, while keeping the electricity charge necessary for the printing low by executing the print job under the condition of the low electricity charge, executing the print job for the user who aims at the certain execution thereof without waiting until the time of a low unit price of the electricity charge, thereby improving user's convenience.

The present invention is characterized by comprising an acquisition unit configured to acquire information related to an electricity charge, and a control unit configured to restrict execution of an input print job based on the information acquired by the acquisition unit; and in that, in a case where the execution of the input print job is restricted based on the information related to the electricity charge, (A) if the input print job is a first print job which has been configured to be executed on a priority basis, the control unit executes the first print job, and (B) if the input print job is a second print job which has not been configured to be executed on a priority basis, the control unit restricts the execution of the second print job.

According to the present invention, it is possible to improve the user's convenience by, while keeping the electricity charge necessary for the printing low by executing the print job under the condition of the low electricity charge, executing the print job for the user who aims at the certain execution thereof without waiting until the time of the low unit price of the electricity charge.

Further features of the present invention will become apparent from the following description of exemplary embodiments with reference to the attached drawings.

DESCRIPTION OF THE EMBODIMENTS

Hereinafter, embodiments for carrying out the present invention will be described with reference to the attached drawings.

First Embodiment

Image Forming Apparatus

Figure 1:
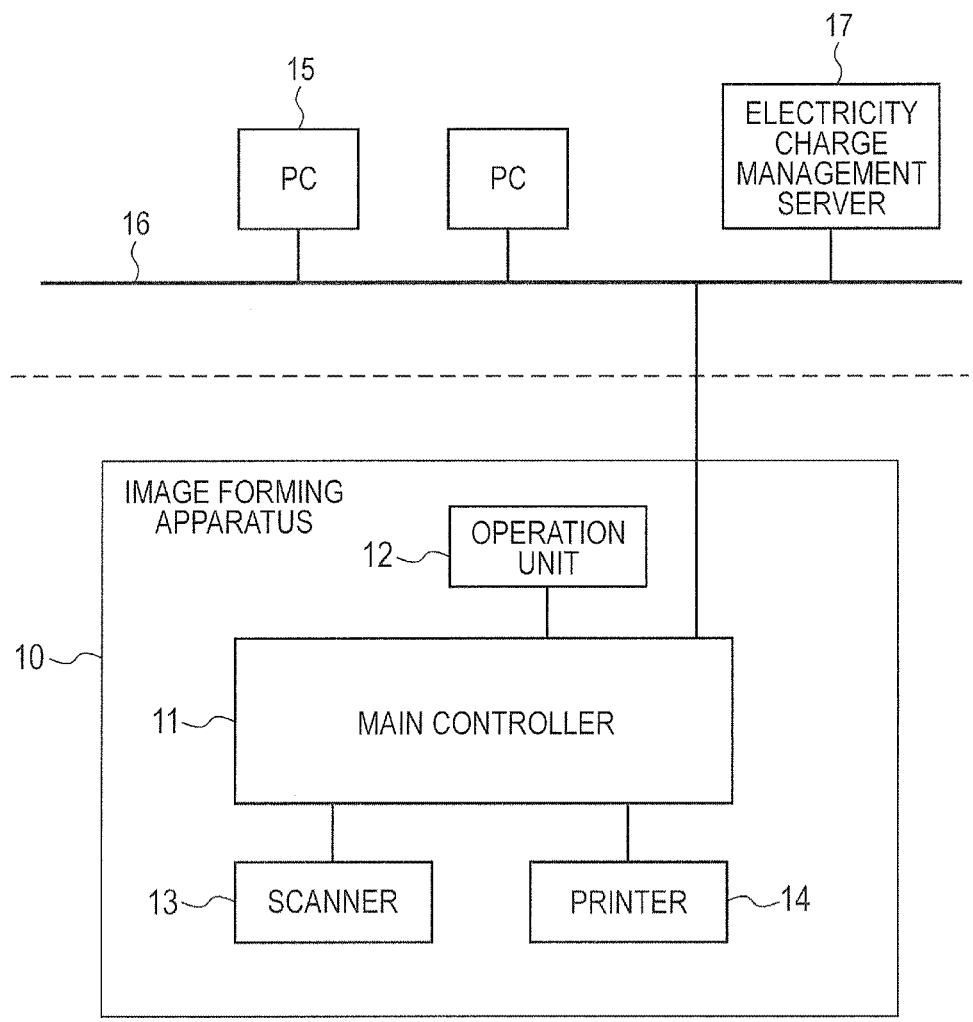
FIG. 1 is a block diagram which illustrates an example of a configuration of a system which includes an image forming apparatus performing image formation in a first embodiment of the present invention.

FIG. 1 is a block diagram which illustrates an example of a configuration of a system which includes an image forming apparatus performing image formation in the first embodiment of the present invention.

An image forming apparatus 10 is a multifunctional machine which inputs and outputs images, transmits and receives image data, and performs various image processes. Incidentally, the image forming apparatus 10 includes a main controller 11, an operation unit 12 serving as a user interface, a scanner 13 serving as an image input device, and a printer 14 serving as an image output device.

The operation unit 12, the scanner 13 and the printer 14, which are respectively connected to the main controller 11, are controlled in response to respective instructions from the main controller 11. Moreover, the main controller 11, which is directly connected to a LAN (local area network) 16, is connected to an electricity charge management server 17, a PC 15 and the like through the LAN 16.

The printer 14 thermally fixes, e.g., a toner image formed by an electrophotographic method, to a paper.

The electricity charge management server 17 manages, at all times, a unit price of an electricity charge of a commercial power supply (hereinafter, simply called an electricity charge) in a circumstance that the image forming apparatus has been installed, by an inquiry to or a notice from a not-illustrated external server of an electric power company. Then, the electricity charge management server 17 notifies the image forming apparatus 10 of information of the electricity charge in response to an inquiry from the image forming apparatus 10 connected through the LAN 16.

The PC 15, which is a general-purpose personal computer, performs communication with the image forming apparatus 10 connected through the LAN 16. A later-described print job is transmitted from the PC 15 to the image forming apparatus 10, when a user instructs printing from the application operating on the PC 15.

Subsequently, the constitution of the main controller 11 included in the image forming apparatus 10 will be described in detail with reference to FIG. 2.

Figure 2:
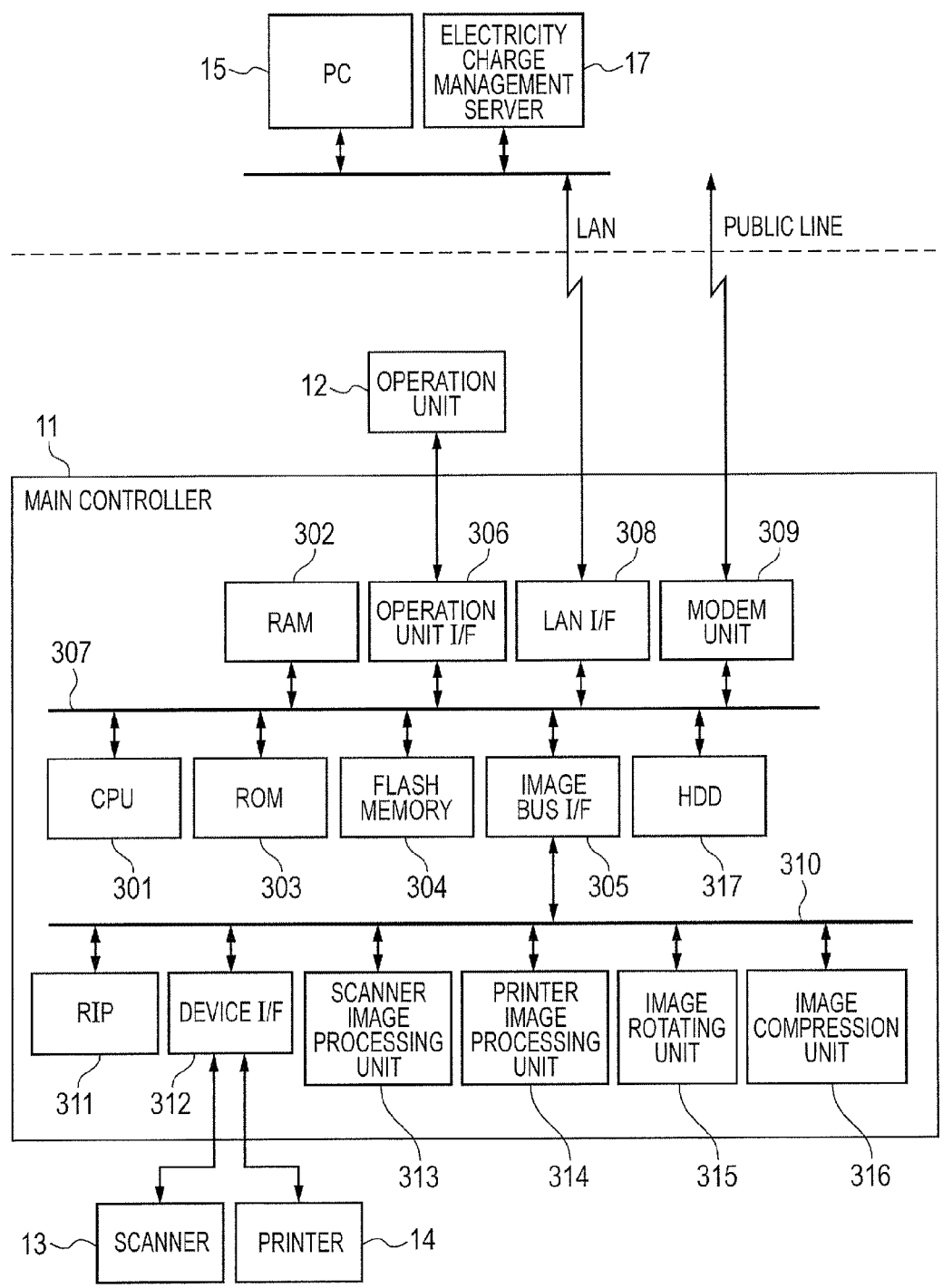
FIG. 2 is a block diagram which illustrates an example of a constitution of a main controller included in the image forming apparatus according to the first embodiment.

FIG. 2 is the block diagram which illustrates an example of the constitution of the main controller 11 included in the image forming apparatus 10.

The main controller 11 controls the image forming apparatus as a whole. More specifically, the main controller 11 controls the scanner 13 and the printer 14, and is on another front connected to the LAN 16 and a public line. Then, the main controller 11 inputs and outputs image information, device information, files and the like from and to an external device through the LAN 16 or the public line.

The main controller 11 is equipped with a CPU (central processing unit) 301 which serves as a main control unit. The CPU 301 is connected to a RAM (random access memory) 302, a ROM (read only memory) 303, a flash memory 304, an image bus I/F (interface) 305, an operation unit I/F 306, a LAN I/F 308 and a modem unit 309, through a system bus 307.

The RAM 302 is a memory in which data can be read and written at all times to provide a working area for the CPU 301, and in which temporary configuration values of the image forming apparatus, information of a job to be executed, and the like are stored. Incidentally, the RAM 302 is also used as an image memory for temporarily storing image data.

The ROM 303 is a boot ROM in which various programs such as a system boot program and the like are computer-readably stored. The flash memory 304 is a non-volatile memory in which system software, configuration value data and the like which should be maintained even after power shutdown of the image forming apparatus 10 are stored.

The operation unit I/F 306 is an interface which is used to input and output data and information between the main controller and the operation unit 12. More specifically, the operation unit I/F 306 is used to output the image data to be displayed to the operation unit 12, and transfer the information input by a user through the operation unit 12 to the CPU 301.

The LAN I/F 308 is an interface which is used to connect the main controller to the LAN 16. More specifically, the LAN I/F 308 is used to input and output information from and to the LAN 16. The modem unit 309 is an interface which is used to connect the main controller to the public line. More specifically, the modem unit 309 inputs/outputs information from/to the public line.

The image bus I/F 305 is an interface which is used to connect the system but 307 to an image bus 310 which transfers image data at high speed. Namely, the image bus I/F 305 operates as a bus bridge for transforming a data structure.

Incidentally, an RIP (raster image processor) 311, a device I/F 312, a scanner image processing unit 313, a printer image processing unit 314, an image rotating unit 315 and an image compression unit 316 are connected to the image bus 310.

The RIP 311 receives, through the LAN I/F 308, PDL (page description language) data transmitted as a print job from, e.g., the PC 15, and decompresses the received data into a bitmap image (bitmap data). The device I/F 312 is an interface which is used to connect the scanner 13 and the printer 14 to the main controller 11. Incidentally, the device I/F 312 performs synchronous/asynchronous transformation of image data.

The scanner image processing unit 313 performs processes such as correction, treating, editing and the like to input image data read from the scanner 13. The printer image processing unit 314 performs processes such as color conversion, filtering, resolution conversion and the like to print output data to be output to the printer 14. The image rotating unit 315 performs rotation to image data. The image compression unit 316 performs a JPEG (Joint Photographic Experts Group) compression/decompression process to multivalued image data, and performs compression/decompression processes such as a JBIG (Joint Bi-level Image experts Group) process, an MMR (Modified Modified Read) process, an MH (Modified Huffman) process and the like to binary image data.

An HDD (hard disk drive) 317 is a non-volatile data storage device, in which various data such as image data, address book data, job logs, user individual data and the like are stored and held. Incidentally, in such a constitution as the main controller 11 does not include the HDD 317, it is assumed that above various data are stored in the flash memory 304.

<Control of Execution and Wait of Print Job>

Subsequently, a control method of controlling execution and a wait of a print job based on the electricity charges of the commercial power supply of the image forming apparatus 10 will be described.

Figure 3:
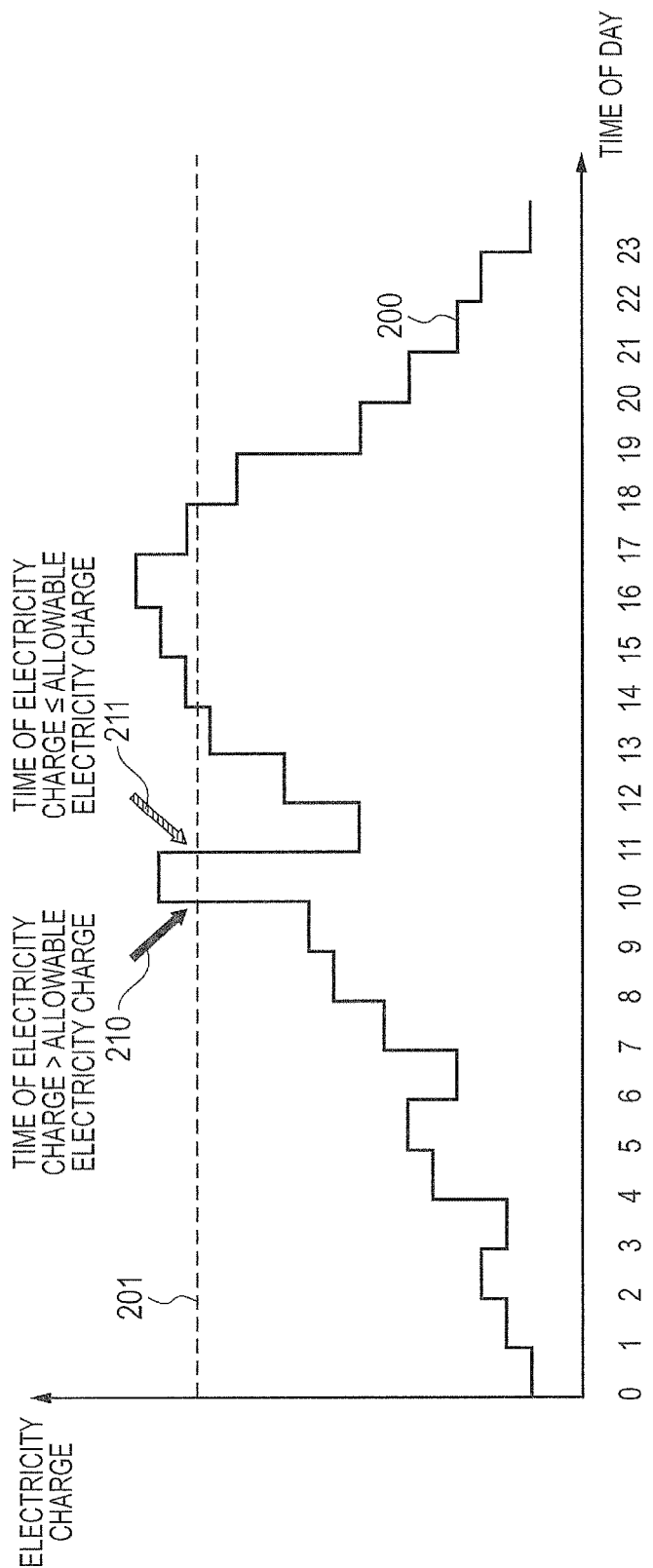
FIG. 3 is a diagram which indicates an example of temporal transition of electricity charges of a commercial power supply in a circumstance that the image forming apparatus according to the first embodiment has been installed.

FIG. 3 is a diagram which indicates an example of temporal transition of the electricity charges of the commercial power supply in a circumstance that the image forming apparatus 10 has been installed.

In FIG. 3, the vertical axis indicates a price of the electricity charges, and the horizontal axis indicates time of day.

In the present embodiment, an electricity charge 200 corresponds to an electricity charge structure which changes per unit time, as illustrated in FIG. 3.

An allowable electricity charge 201 indicates a threshold of a unit price of the electricity charge by which the image forming apparatus 10 allows (permits) the execution of the print job. More specifically, if the electricity charge 200 at a point of time when the image forming apparatus 10 starts the print job is equal to or lower than the allowable electricity charge 201, the image forming apparatus 10 executes the print job. On the other hand, as illustrated by a period between times 210 to 211 in FIG. 3, if the electricity charge 200 is higher than the allowable electricity charge 201, the image forming apparatus 10 does not execute the print job, and waits until the electricity charge 200 becomes equal to or lower than the allowable electricity charge 201.

Then, as indicated by a point of time immediately after the time 211 of FIG. 3, if the electricity charge 200 is equal to or lower than the allowable electricity charge 201, the image forming apparatus 10 executes the print job for which the image forming apparatus 10 has been waiting.

That is, during the period of time in which the electricity charge 200 is higher than the allowable electricity charge 201, it is possible to restrain the image forming apparatus 10 from executing the print job consuming vast amounts of power. Thus, it is possible to lower the necessary electricity charges.

Here, it should be noted that the allowable electricity charge 201 is a set value which has been held in the image forming apparatus 10. For example, an administrator of the image forming apparatus 10 may previously set the allowable electricity charge 201 from the operation unit 12. The setting of the allowable electricity charge 201 shall be stored in the HDD 317, and then read from the HDD 317 to the RAM 302 by the CPU 301 when the operation of the image forming apparatus 10 is started.

In the case of starting the print job, the image forming apparatus 10 inquires of the electricity charge management server 17 about the electricity charge, and then receives from the electricity charge management server 17 the electricity charge 200 at the point of time of starting the print job. Subsequently, the image forming apparatus 10 judges whether to execute or wait for the print job by comparing the received electricity charge 200 at the point of time of starting the print job with the allowable electricity charge 201 held by the image forming apparatus 10.

Here, it should be noted that the print jobs which are accepted by the image forming apparatus 10 are executed basically in the order of early input. The image forming apparatus 10 manages the received print jobs as first-in first-out queues on the RAM 302.

Figure 4:
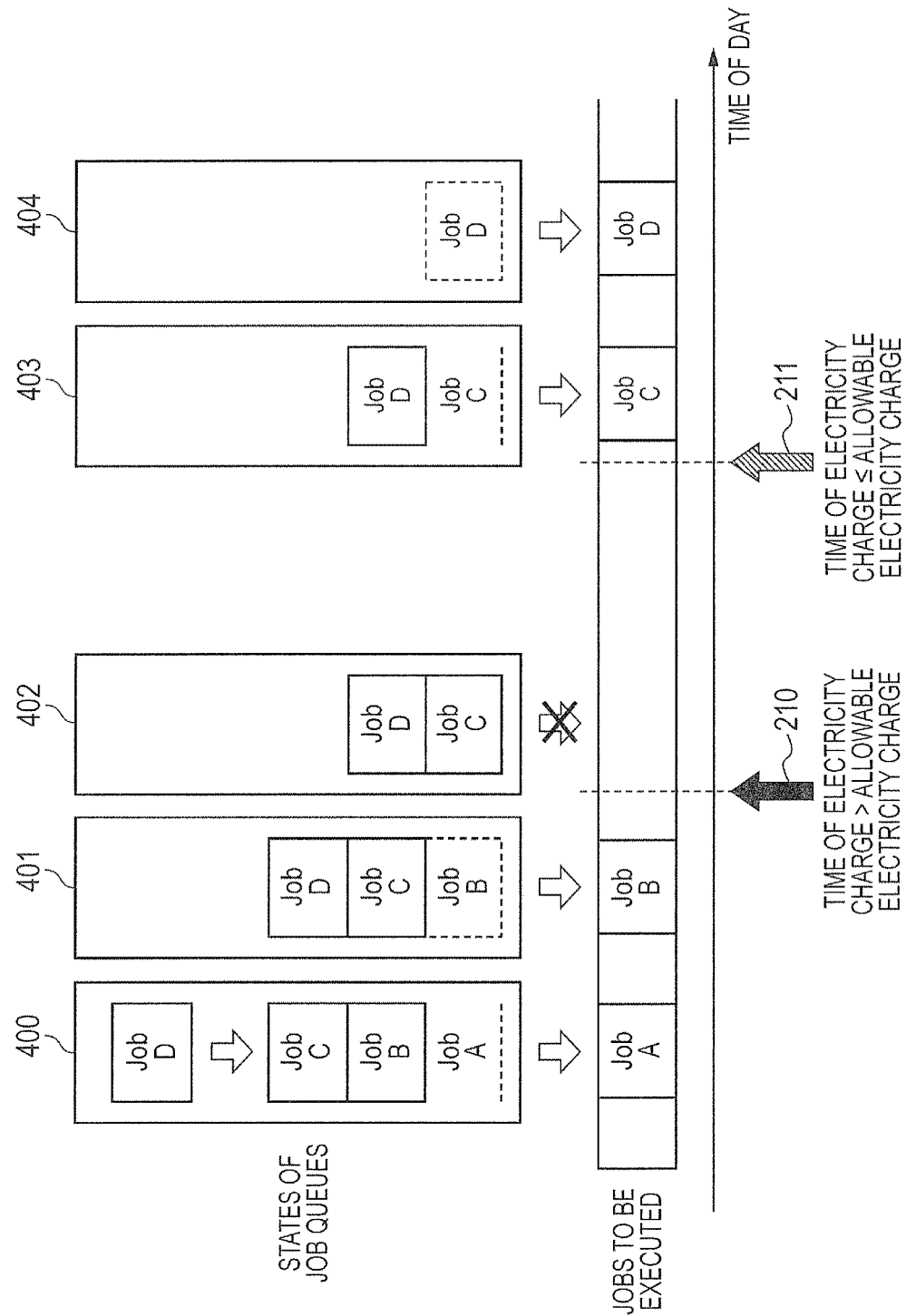
FIG. 4 is a pattern diagram which indicates states of job queues of the image forming apparatus according to the first embodiment.

FIG. 4 is a pattern diagram which indicates states of queues for managing the print jobs received by the image forming apparatus 10, with temporal development from a job queue state 400 to a job queue state 404.

Incidentally, it should be noted that the times 210 and 211 in FIG. 4 respectively correspond to the times 210 and 211 in FIG. 3.

In the job queue state 400, the image forming apparatus 10 executes a print job Job A, and further receives a print job Job D as a new job. Then, in the job queue state 401, the image forming apparatus 10 executes a print job Job B.

Then, in the job queue state 402, although it is the order that the image forming apparatus 10 should execute a print job Job C, it has exceeded the time 210 and thus the electricity charge 200 is higher than the allowable electricity charge 201. Therefore, the image forming apparatus 10 waits for the print job Job C without executing it.

Then, in the job queue state 403, since it has exceeded the time 211 and thus the electricity charge 200 is equal to or lower than the allowable electricity charge 201, the image forming apparatus 10 starts to execute the print job Job C for which the image forming apparatus 10 has been waiting.

In the job queue state 404, the image forming apparatus 10 executes the print job Job D, and thus the print job in the job queue becomes non-existent. As just described, the image forming apparatus 10 controls the execution of the print job and the wait, on the basis of the electricity charges 200 and the allowable electricity charge 201.

Moreover, under the condition that the electricity charge 200 is higher than the allowable electricity charge 201, since the power to be consumed to decompress the PDL data into the bitmap image by the RIP 311 is small, the PDL data is actually decompressed into the bitmap image, and the decompressed bitmap image is stored in the HDD 317. Then, the image forming apparatus 10 waits for a next job. Thus, it is possible to have a constitution of actually printing the bitmap image stored in the HDD 317 after the electricity charge 200 was lowered to be equal to or lower than the allowable electricity charge 201.

If the PDL data has been previously decompressed into the bitmap image as just described, it is possible to shorten the time from a printing start to a printed-paper output.

<Control of Execution of Priority Print Job>

Subsequently, in addition to the control method of controlling the execution and the waiting of the print job of the image forming apparatus 10, a control method of controlling execution of a priority print job based on a priority print configuration of the print job will be described.

Figure 5:
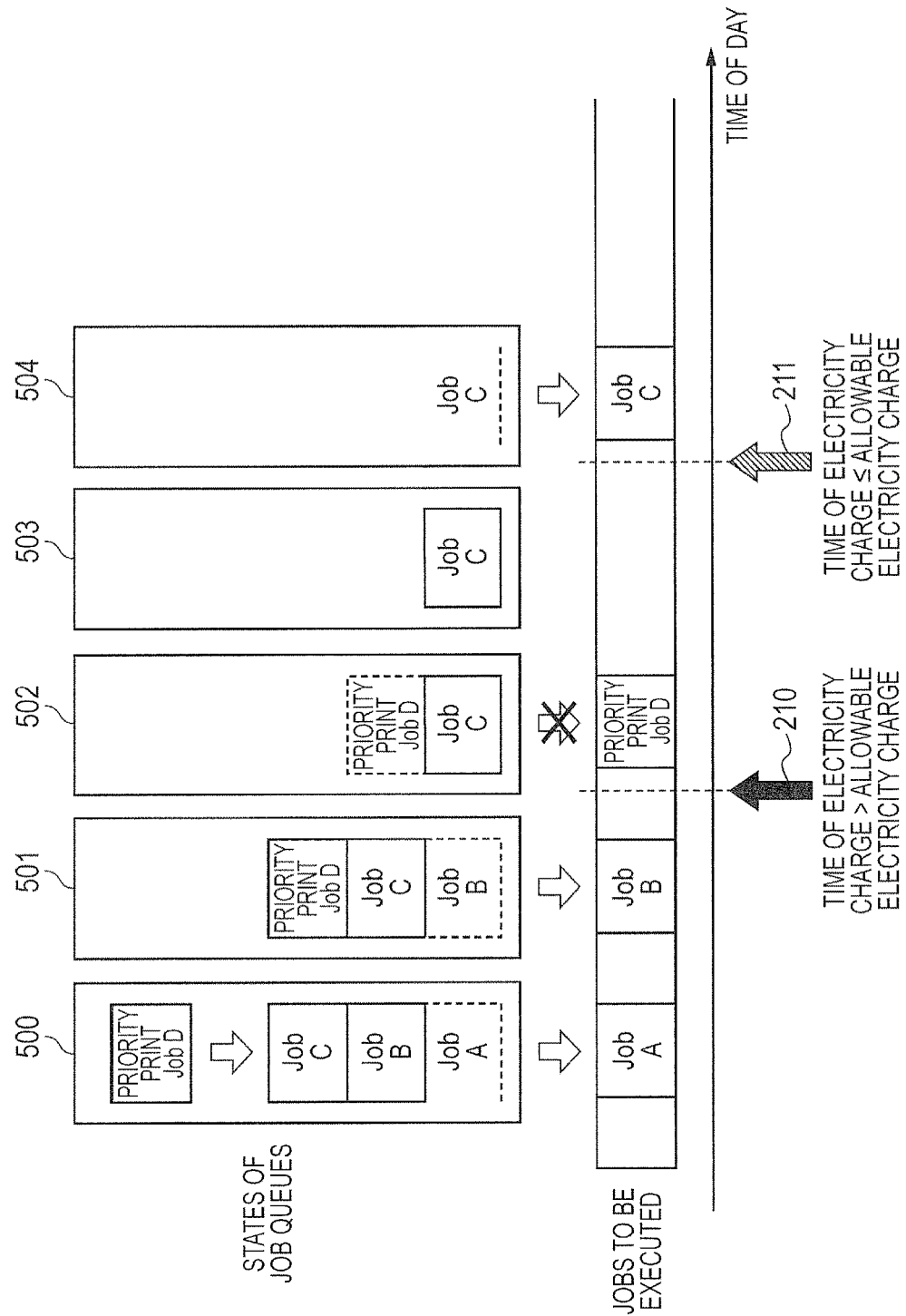
FIG. 5 is a pattern diagram which indicates the states of the job queues including a priority print job of the image forming apparatus according to the first embodiment.

FIG. 5 is a pattern diagram which indicates states of queues for managing the print jobs received by the image forming apparatus 10, with temporal development from a job queue state 500 to a job queue state 504.

Incidentally, it should be noted that the times 210 and 211 in FIG. 5 respectively correspond to the times 210 and 211 in FIG. 3. In addition, it should be noted that the job queues illustrated in FIG. 5 are different from the job queues illustrated in FIG. 4 in the point that a priority print job Job D to which the priority print configuration (i.e., a print configuration of which execution priority is higher than that of a print configuration of a normal print job) has been established is included in the job queues illustrated in FIG. 5.

In the job queue state 500, the image forming apparatus 10 executes a print job Job A, and further receives the priority print job Job D as a new job. Then, in the job queue state 501, the image forming apparatus 10 executes a print job Job B.

In the job queue state 502, although it is the order that the image forming apparatus 10 should execute a print job Job C, it has exceeded the time 210 and thus the electricity charge 200 is higher than the allowable electricity charge 201. Therefore, the image forming apparatus 10 waits for the print job Job C without executing it. Meanwhile, since the priority print job Job D to which the priority print configuration has been established is included in the job queue, the image forming apparatus 10 preferentially executes the priority print job Job D without executing the print job Job C which should be originally executed in the original order.

In the job queue state 503, since the electricity charge 200 is still higher than the allowable electricity charge 201 and a job to which the priority print configuration has been established does not exist in the job queue, the image forming apparatus 10 continuously waits for the print job Job C without executing it.

In the job queue state 504, since it has exceeded the time 211 and thus the electricity charge 200 is equal to or lower than the allowable electricity charge 201, the image forming apparatus 10 starts to execute the print job Job C for which the image forming apparatus 10 has been waiting, and thus the print job in the job queue becomes non-existent.

As just described, in the control of the execution and the waiting of the print job based on the electricity charges 200 and the allowable electricity charge 201, even in the period of time in which the electricity charge 200 is higher than the allowable electricity charge 201, it is possible for the image forming apparatus 10 to execute, without waiting, the print job to which the priority print configuration has been established.

<Designation of Priority Print Job>

The print job is issued by a printer driver which has been incorporated in the PC 15 and corresponds to the image forming apparatus 10. When a user instructs printing from an application operating on the PC 15, he/she instructs to configure and issue the print job on a print configuration screen (FIG. 6) provided by the printer driver.

Figure 6:
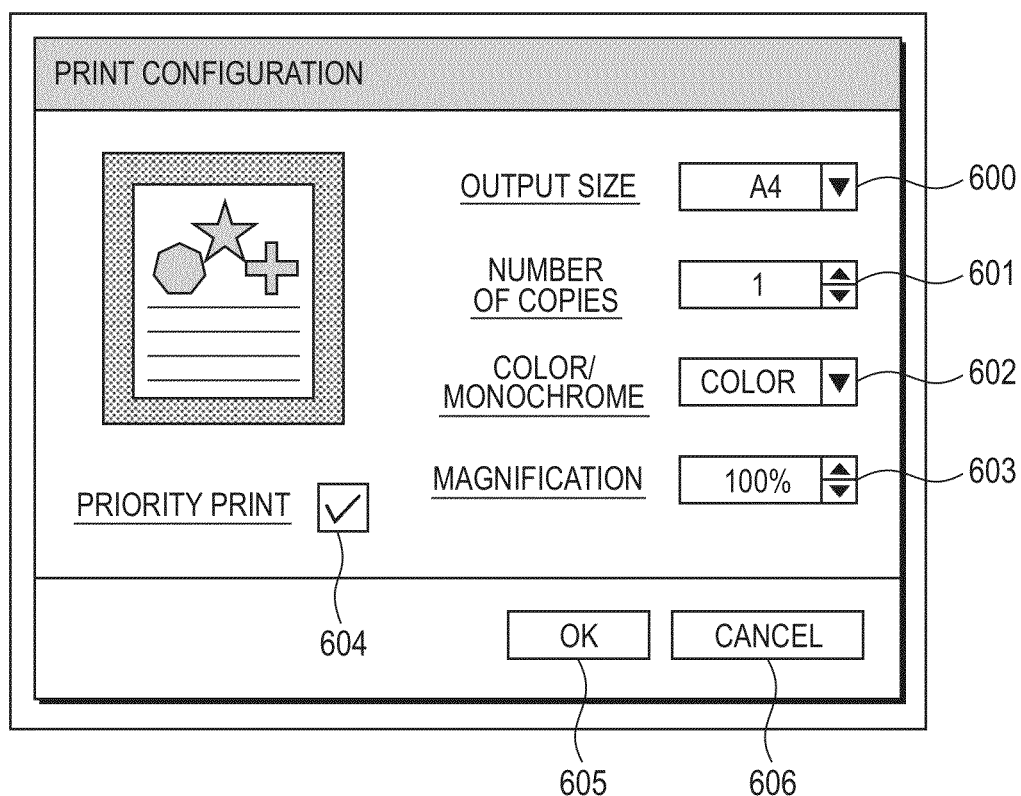
FIG. 6 is a diagram which illustrates an example of a print configuration screen of a printer driver to be displayed on a PC (personal computer) according to the first embodiment.

FIG. 6 is the diagram which illustrates an example of the print configuration screen of the printer driver to be displayed on a monitor of the PC 15.

On the print configuration screen illustrated in FIG. 6, at an output size designation portion 600, a size of a paper to be output in the print job of the image forming apparatus 10 is designated as, e.g., "A4" or the like. At a copy number designation portion 601, the number of copies to be output in the print job of the image forming apparatus 10 is designated.

At a color/monochrome designation portion 602, it is selected whether to output an image as a color image or a monochrome image. At a magnification designation portion 603, an image size to be output to a paper is designated as a ratio of the output size to an original size managed on the application.

At a priority print designation portion 604, it is designated whether or not to apply a priority print configuration to the print job. More specifically, when the priority print configuration is applied, as indicated by "the priority print job Job D" illustrated in FIG. 5, the designated print job can be executed even in the period of time in which the electricity charge 200 is higher than the allowable electricity charge 201. On the other hand, when the priority print configuration is not applied, as indicated by "the print job Job C" illustrated in FIG. 5, the relevant print job cannot be executed in the period of time in which the electricity charge 200 is higher than the allowable electricity charge 201.

Then, it is designated by pressing an OK button 605 to issue the print job based on the configuration designated at each of the designation portions 600 to 604, and the print configuration screen is closed. On the other hand, it is designated by pressing a cancel button 606 to cancel issuing of the print job, and the print configuration screen is closed.

As just described, when the user instructs the printing from the application operating on the PC 15, the print job is transmitted from the PC 15 to the image forming apparatus 10. That is, in the present embodiment, the priority print configuration is established at the time when the print job is issued.

Incidentally, when the priority print configuration is applied, e.g., an administrator of the image forming apparatus 10 can previously designate, from the operation unit 12, use permission of the priority print configuration by a user or a group (priority user configuration). In this case, if a user who has not been allowed to use the priority print configuration intends to apply the priority print configuration at the priority print designation portion 604, he/she cannot actually select the priority print configuration because the check box of the priority print designation portion 604 is in a gray-out state. Even if the relevant user selects the priority print configuration, the selected configuration does not become effective resultingly. Consequently, it is possible to control the permission of the priority print configuration by a user or a group, and it is thus possible to prevent that the priority print job is randomly used.

<Judgment Process of Execution and Waiting of Print Job>

Figure 7:
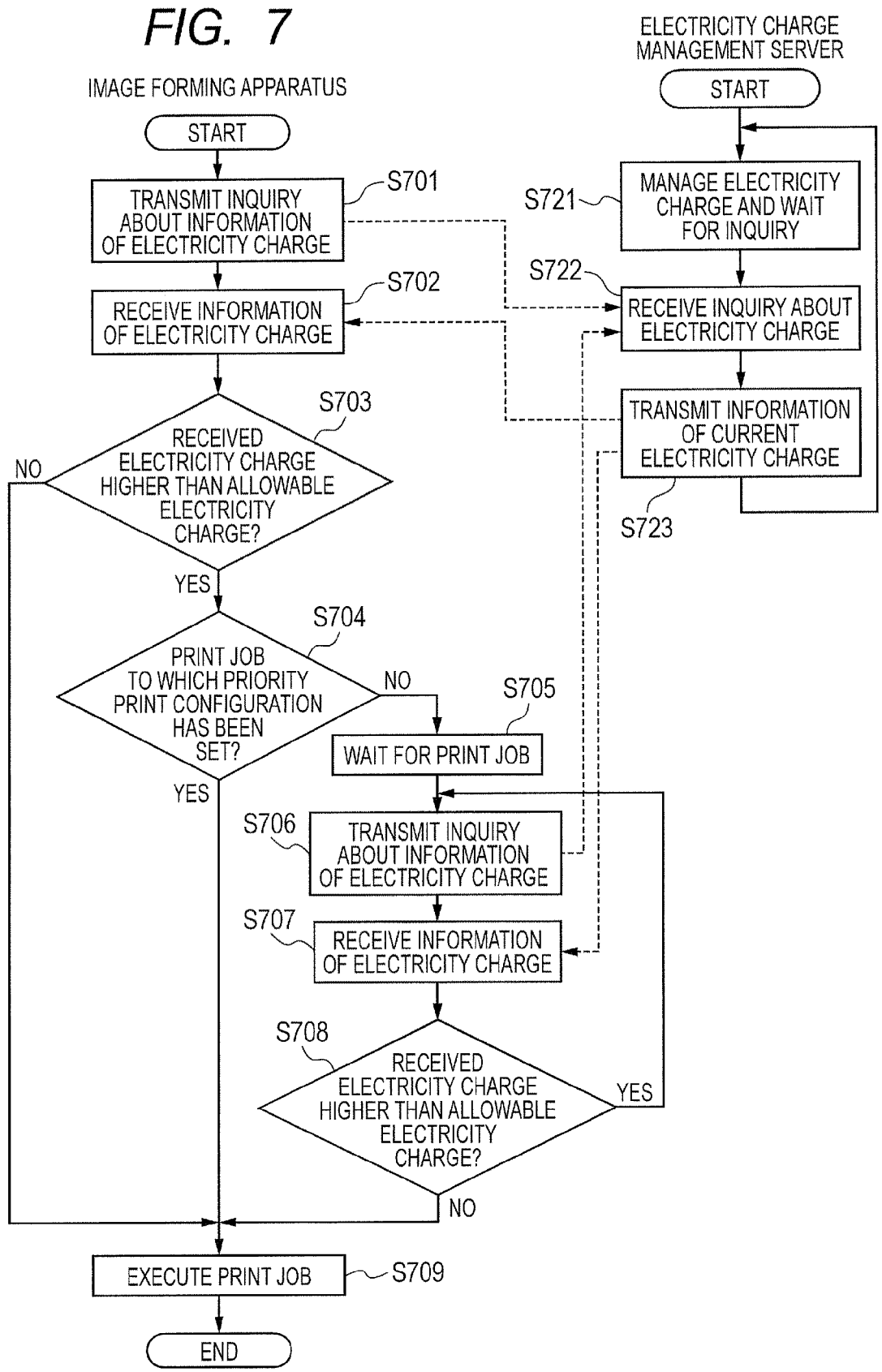
FIG. 7 is a flow chart of a judgment process for judging whether to execute or wait for a print job on the basis of the electricity charges of the commercial power supply of the image forming apparatus according to the first embodiment.

FIG. 7 is a flow chart indicating an example of a judgment process for judging whether to execute or wait for the print job on the basis of the electricity charges of the commercial power supply of the image forming apparatus 10 according to the present embodiment.

Incidentally, it should be noted that steps S701 to S709 in this flow chart are related to, in the job queue in which the image forming apparatus 10 receives the print jobs from the PC 15 through the LAN I/F 308 and the RAM 302 stores the received print jobs therein, control of the print job of which the printing is started hereafter. Furthermore, it should be noted that the steps S701 to S709 in this flow chart are achieved on the premise that the CPU 301 of the main controller 11 executes the programs stored in the ROM 303 to control the execution and the waiting of the print job on the job queue stored in the RAM 302 on the basis of the set value of the allowable electricity charge 201 stored in the RAM 302 and the electricity charge 200 received from the electricity charge management server 17.

In addition, it should be noted that steps S721 to S723 in this flow chart are related to a process in which the electricity charge management server 17 receives an inquiry about the electricity charge from the image forming apparatus 10 through the LAN I/F 308 and then notifies the image forming apparatus 10 of a current electricity charge. Furthermore, it should be noted that the steps S721 to S723 in this flow chart are achieved on the premise that a CPU (not illustrated) of the electricity charge management server 17 executes programs computer-readably stored in an external storage device of the electricity charge management server 17.

Initially, in S721, the CPU of the electricity charge management server 17, which manages at all times the electricity charges of the commercial power supply in the circumstance that the image forming apparatus 10 has been installed, waits for an inquiry about information of the electricity charge from a device connected through the LAN 16.

On the other hand, when the print job exists in the job queue stored in the RAM 302, the CPU 301 of the image forming apparatus 10 starts to process the one or more print jobs in the job queue in the order of acceptance, and executes the processes in S701 to S709 for each print job.

In the case of starting the print job, the CPU 301 of the image forming apparatus 10 transmits in S701 an inquiry about the information of the electricity charge 200 (i.e., a current unit price indicating the unit price of the electricity charge at that point) to the electricity charge management server 17 through the LAN I/F 308.

Then, in S722, the CPU of the electricity charge management server 17 receives the inquiry about the electricity charge 200 from the image forming apparatus 10, and advances the process to S723.

In S723, the electricity charge management server 17 transmits, to the image forming apparatus 10, the information of the electricity charge 200 (i.e., the current unit price indicating the unit price of the electricity charge at that point) of the commercial power supply managed by the electricity charge management server 17. Then, the CPU of the electricity charge management server 17 again returns the process to S721 to wait for an inquiry about the information of the electricity charge from a device connected through the LAN 16.

In S702, the CPU 301 of the image forming apparatus 10 receives (acquires) the information of the electricity charge 200 at this point from the electricity charge management server 17 through the LAN I/F 308.

Next, in S703, the CPU 301 of the image forming apparatus 10 compares the electricity charge 200 received from the electricity charge management server 17 in S702 with the allowable electricity charge 201 previously set in the RAM 302.

Then, when it is judged in S703 that the electricity charge 200 is equal to or lower than the allowable electricity charge 201 (that is, the electricity charge is equal to or lower than a threshold) (NO in S703), the CPU 301 of the image forming apparatus 10 advances the process to S709. In S709, the CPU 301 of the image forming apparatus 10 executes the print job in process, and completes the process to the relevant print job. After then, when the print job exists in the job queue stored in the RAM 302, the CPU 301 of the image forming apparatus 10 executes the processes in S701 to S709 to the next print job.

On the other hand, when it is judged in S703 that the electricity charge 200 is higher than the allowable electricity charge 201 (YES in S703), the CPU 301 of the image forming apparatus 10 advances the process to S704.

In S704, the CPU 301 of the image forming apparatus 10 judges whether or not the print job in process is the print job to which the priority print configuration has been established.

Then, when it is judged that the relevant print job is the print job to which the priority print configuration has been established (YES in S704), the CPU 301 of the image forming apparatus 10 advances the process to S709 to execute the relevant print job, and completes the process to the relevant print job. After then, when the print job exists in the job queue stored in the RAM 302, the CPU 301 of the image forming apparatus 10 executes the processes in S701 to S709 to the next print job.

On the other hand, when it is judged in S704 that the relevant print job is the print job to which the priority print configuration has not been established (NO in S704), the CPU 301 of the image forming apparatus 10 advances the process to S705.

In S705, the CPU 301 of the image forming apparatus 10 waits to execute the relevant print job. In this case, the CPU 301 of the image forming apparatus 10 may wait to execute the relevant print job after decompressing the PDL data into the bitmap image data with the RIP 311 for which the power to be consumed is small and storing the acquired bitmap image data in the HDD 317.

Next, in S706, the CPU 301 of the image forming apparatus 10 inquires of the electricity charge management server 17 about the information of the electricity charge 200 through the LAN I/F 308 (as well as the process in S701). Then, in S707, the CPU 301 of the image forming apparatus 10 receives the information of the electricity charge 200 at this point from the electricity charge management server 17 through the LAN I/F 308 (as well as the process in S702).

Next, in S708, the CPU 301 of the image forming apparatus 10 compares the electricity charge 200 received from the electricity charge management server 17 with the allowable electricity charge 201 previously set in the RAM 302 (as well as the process in S703).

Then, when it is judged in S708 that the electricity charge 200 is higher than the allowable electricity charge 201 (YES in S708), the CPU 301 of the image forming apparatus 10 returns the process to S706. As indicated in the processes in S706 to S708, the CPU 301 of the image forming apparatus 10 waits for the relevant print job until the electricity charge 200 becomes equal to or lower than the allowable electricity charge 201, by repeating such an inquiry polling process from the image forming apparatus 10 to the electricity charge management server 17.

Incidentally, during the waiting in S706 to S708, when the job (i.e., the priority print job) to which the priority print configuration has been established exists in the job queue stored in the RAM 302, the CPU 301 of the image forming apparatus 10 executes the processes in S701 to S709 to the priority print job in the job queue. Thus, it is possible to execute the priority print job even in the case of waiting for the normal print job in the state that the electricity charge 200 is equal to or lower than the allowable electricity charge 201.

On the other hand, when it is judged in S708 that the electricity charge 200 is equal to or lower than the allowable electricity charge 201 (NO in S708), the CPU 301 of the image forming apparatus 10 advances the process to S709. In S709, the CPU 301 of the image forming apparatus 10 executes the relevant print job, and completes the process to the relevant print job. After then, when the print job exists in the job queue stored in the RAM 302, the CPU 301 of the image forming apparatus 10 executes the processes in S701 to S709 to the next print job.

Incidentally, in the present embodiment, the allowable electricity charge 201 is the set value which has been previously set by the administrator of the image forming apparatus 10 through the operation unit 12 and stored and held in the image forming apparatus 10. However, it is possible to give a constitution that the allowable electricity charge 201 is held in the electricity charge management server 17, transmitted in S723 together with the information of the current electricity charge to the image forming apparatus 10 from which the electricity charge was inquired, and received by the image forming apparatus 10. In such a case, for example, the administrator of the image forming apparatus 10 previously sets the allowable electricity charge to the electricity charge management server 17.

According to the above process flow, it is possible to lower the necessary electricity charge by executing the print job under the low-priced electricity charge, on the basis of the setting of the allowable electricity charge 201. At the same time, it is also possible to execute, without waiting, the print job for the user who aims at certain print job execution, on the basis of the priority print configuration.

Incidentally, although the electricity charge system in which the electricity charge changes per unit time has been described in the present embodiment, the present invention is not limited to this system. For example, the electricity charge may change per unit minutes or unit day. That is, the present invention is not influenced by the length of the change of the electricity charge.

Moreover, in the present embodiment, the print job of the present invention in which the execution or the waiting of the printing is controlled based on the electricity charge has been described as the print job which is transmitted from the PC 15 to the image forming apparatus 10 by the user's print instruction from the application operating on the PC 15. However, which kind of print job may be included in the print job of the present invention. For example, a copy job in which image information read from the scanner 13 is printed by the printer 14 in response to an instruction from the operation unit 12 may be included in the print job of the present invention.

Moreover, in the present embodiment, the allowable electricity charge 201 is previously set by the administrator of the image forming apparatus 10. However, the allowable electricity charge may be calculated from a job execution history. For example, the information such as the electricity charge at the time when the process of the print job is started, the allowable electricity charge, the waiting time due to the execution restriction based on the electricity charge of the print job, and the like is accumulated and stored in the HDD 317 of the image forming apparatus 10 as the job execution history. Then, the CPU 301 of the image forming apparatus 10 may calculate the allowable electricity charge in such a way that the waiting time due to the execution restriction based on the electricity charge of the print job in the job execution history is, e.g., within three hours. Alternatively, the CPU 301 of the image forming apparatus 10 may calculate the allowable electricity charge in such a way that a ratio of the print jobs in which the waiting time due to the execution restriction based on the electricity charge is not "0" (i.e., the jobs for which the image forming apparatus 10 has been waiting) to the print jobs in the job execution history is, e.g., within 25%.

Second Embodiment

Image Forming Apparatus

Hereinafter, the second embodiment of the present invention will be described with reference to the attached drawings.

In the present embodiment, an example in which, when a priority print job to which priority print configuration has been established is received, an image forming apparatus controls execution of the priority print job will be described.

In the present embodiment, it is controlled to start executing a job, to which the priority print configuration has been established, in priority to a normal print job existing in a job queue. Thus, it is possible to execute the print job of a user who aims at certain execution thereof without waiting.

Moreover, it is possible to further lower the electricity charge necessary to execute the print job of the image forming apparatus by increasing opportunities of executing the jobs to which the priority print configuration has been established in a period of time in which the electricity charge is equal to or lower than the allowable electricity charge.

Incidentally, since the configuration of the image forming apparatus in the second embodiment is the same as that of the image forming apparatus 10 in the first embodiment, only a difference of states of the job queues at the time when the print job to which the priority print configuration has been established is received will be described.

<Control of Execution of Priority Print Job>

Figure 8:
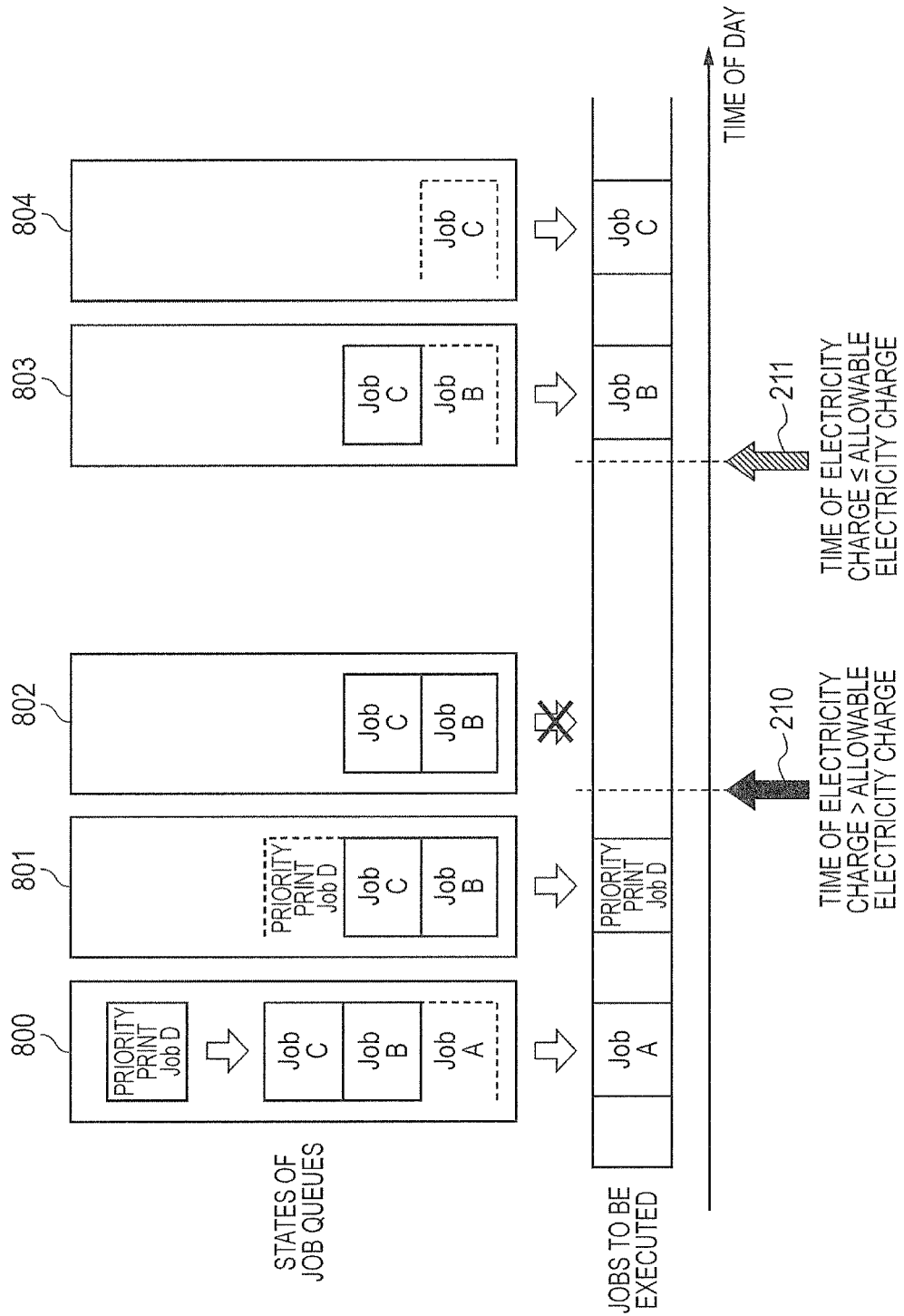
FIG. 8 is a pattern diagram which indicates states of job queues including a priority print job of the image forming apparatus according to a second embodiment.

FIG. 8 is a pattern diagram which indicates states of queues for managing the print jobs received by the image forming apparatus 10 in the present embodiment, with temporal development from a job queue state 800 to a job queue state 804.

Incidentally, it should be noted that times 210 and 211 in FIG. 8 respectively correspond to the times 210 and 211 in FIG. 3.

In the job queue state 800, the image forming apparatus 10 executes a print job Job A, and further receives a priority print job Job D as a new job.

Then, in the job queue state 801, the image forming apparatus 10 executes the priority print job Job D, to which the priority print configuration has been established, in priority to normal print jobs Job B and Job C.

Then, in the job queue state 802, although it is the order that the image forming apparatus 10 should execute the print job Job B, it has exceeded the time 210 and thus an electricity charge 200 is higher than an allowable electricity charge 201. Therefore, the image forming apparatus 10 waits for the print job Job B without executing it.

Then, in the job queue state 803, since it has exceeded the time 211 and thus the electricity charge 200 is equal to or lower than the allowable electricity charge 201, the image forming apparatus 10 starts to execute the print job Job B for which the image forming apparatus 10 has been waiting. In the job queue state 804, the image forming apparatus 10 executes the print job Job C, and thus the print job in the job queue becomes non-existent.

The job queue states illustrated in FIG. 8 are different from the job queue states illustrated in FIG. 5 in the point that the priority print job Job D to which the priority print configuration has been established is executed in the period of time between the time 210 and the time 211, that is, before the period of time in which the electricity charge 200 is higher than the allowable electricity charge 201.

As just described, even if the similar print jobs are input to the image forming apparatus 10, it is possible to increase the opportunities for executing the print jobs in the period of time in which the electricity charge is equal to or lower than the allowable electricity charge, by controlling to advance the start of the execution of the print job to which the priority print configuration has been established. Therefore, the image forming apparatus 10 can keep the total electricity charges necessary for executing the print jobs lower.

Incidentally, in the first embodiment illustrated in FIG. 7, when the electricity charge 200 is equal to or lower than the allowable electricity charge 201, the print jobs in the job queue are processed in the order of acceptance. Moreover, when the electricity charge 200 is higher than the allowable electricity charge 201 and the job (i.e., the priority print job) to which the priority print configuration has been established exists in the job queue stored in the RAM 302 in the waiting of the print job in process (S706 to S708 in FIG. 7), the CPU 301 of the image forming apparatus 10 executes the processes in S701 to S709 to the priority print job in the job queue.

However, in the second embodiment, in both the case where the electricity charge 200 is equal to or lower than the allowable electricity charge 201 and the case where the electricity charge 200 is higher than the allowable electricity charge 201, when the job (i.e., the priority print job) to which the priority print configuration has been established is received, the CPU 301 of the image forming apparatus 10 immediately executes the processes in S701 to S709 of FIG. 7 to the received priority print job.

Third Embodiment

Image Forming Apparatus

Hereinafter, the third embodiment of the present invention will be described with reference to the attached drawings.

In the present embodiment, an example in which a CPU of an image forming apparatus controls execution of a normal print job for which the image forming apparatus has been waiting because the electricity charge is higher than the allowable electricity charge, in response to a user's instruction received by an operation unit of the image forming apparatus will be described.

In the present embodiment, a start of the executing of the normal print job for which the image forming apparatus has been waiting because the electricity charge is higher than the allowable electricity charge is controlled. Thus, the present embodiment enables to, after once issuing a print job, designate the issued print job as a priority print job, and enables to execute the print job of a user who aims at certain execution thereof without waiting of the user.

Incidentally, since the configuration of the image forming apparatus in the third embodiment is similar to that of the image forming apparatus 10 in the first embodiment, only differences will be described.

<User Authentication Using Operation Unit>

Figure 9:
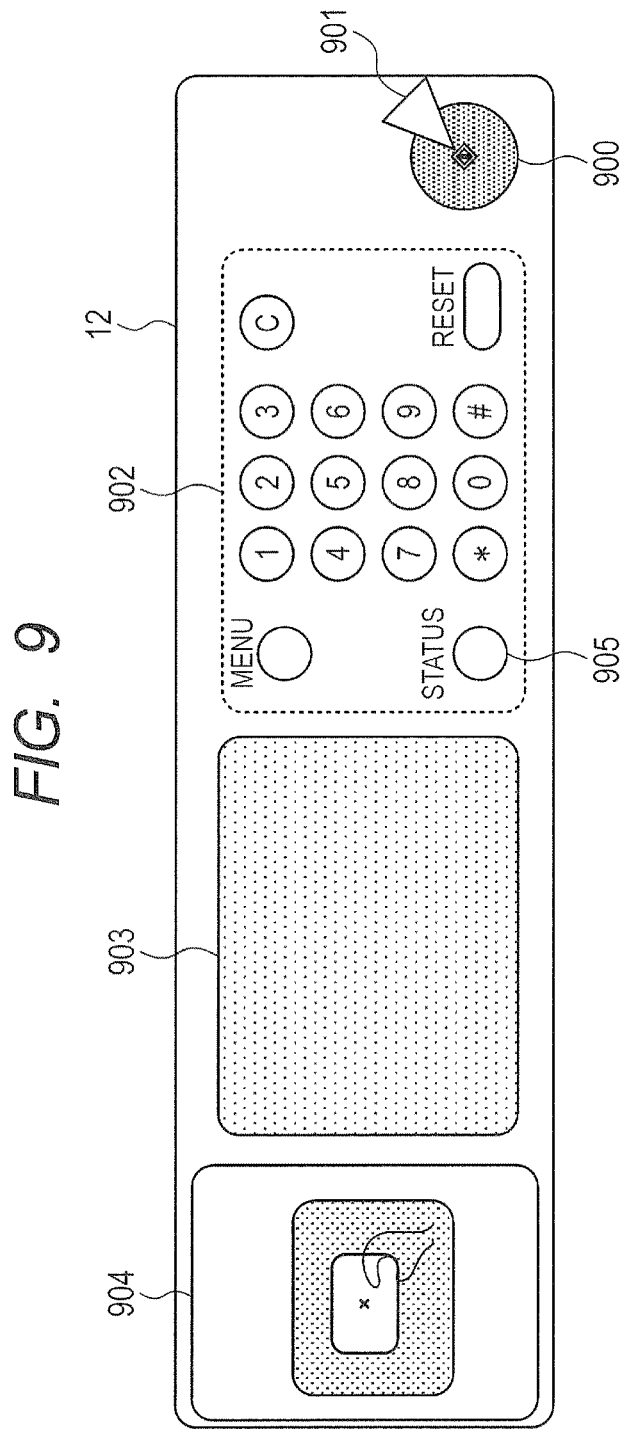
FIG. 9 is a diagram which illustrates an example of an outer appearance of an operation unit of the image forming apparatus according to a third embodiment.

FIG. 9 is a diagram which illustrates an example of an outer appearance of an operation unit 12 of the image forming apparatus 10.

Hereinafter, a constitution of the operation unit 12 and a mechanism of authenticating a user who uses the image forming apparatus 10 will be described with reference to FIG. 9.

The operation unit 12 includes a start key 900, a stop key 901, a hard key group 902, a liquid crystal operation panel 903 and a card reader 904.

The liquid crystal operation panel 903, which is a combination of a liquid crystal display and a touch panel, displays an operation screen. In addition, when the display key is pressed by the user, the liquid crystal operation panel 903 reads display key information indicating the display key at the pressed position.

The start key 900 is used when original scanning, original copying or the like is started, and is also used to instruct starting of other functions. The stop key 901 is used to instruct stopping of the running operations.

The hard key group 902, which includes a numerical keypad, a clear key, a reset key, a menu key and a status key 905, is used to input numerals, clear numerals, reset input data, and instruct various information displays and the like.

An operation menu of the image forming apparatus 10 is displayed on the display screen of the liquid crystal operation panel 903 to urge user's operations. Moreover, device information such as operation states of the image forming apparatus 10, remaining amounts of papers, toners and the like is displayed on the display screen.

The card reader 904 is a reading device which can read information stored in an IC card. For example, the card reader 904 may have a constitution of reading the information from the IC card in a non-contact manner when the user passes the relevant IC card over the upper surface of the card reader 904. Alternatively, the card reader 904 may have a constitution of reading the information from the IC card in a contact manner when the user inserts the relevant IC card into the card reader 904. Incidentally, the information to be stored in the IC card includes account information for the user who uses the image forming apparatus 10, or the like.

In the image forming apparatus 10, the CPU 301 performs user authentication by comparing the account information read by the card reader 904 with account information for the user previously stored in the HDD 317. Moreover, the image forming apparatus 10 can restrict use by the user. More specifically, only when the compared and checked account information is directed to the user who has been permitted to use the image forming apparatus 10, the image forming apparatus 10 can be actually used by the relevant user.

Incidentally, although the user authentication is executed using the account information for the user stored in the HDD 317 in the present embodiment, the present invention is not limited to this. That is, a not-illustrated server which is connected to the image forming apparatus through the LAN 16 may previously store account information for the user and execute an authentication process based on the stored account information.

<Job Situation Confirmation Screen>

After the user authentication using the card reader 904, the user can confirm a status (or situation) of the job queues of the print jobs input in the image forming apparatus 10, by pressing the status key 905 of the hard key group 902 on the operation unit 12 of the image forming apparatus 10. That is, after the user authentication using the card reader 904, if it is detected that the status key 905 is pressed, the image forming apparatus 10 controls to display, on the display screen of the liquid crystal operation panel 903 on the operation unit 12, the states of the print jobs existing in the job queue stored in the RAM 302 (FIG. 10).

Figure 10:
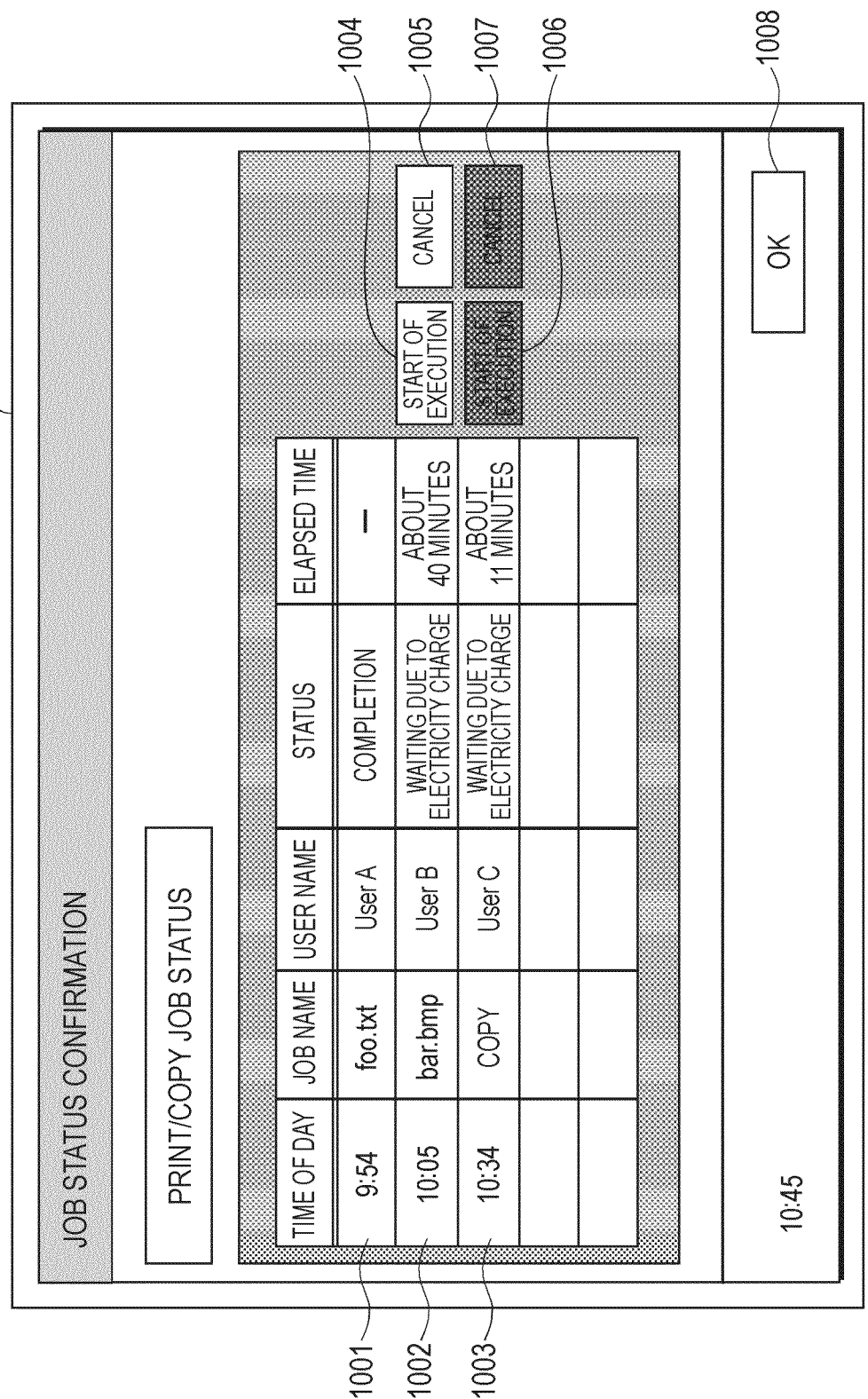
FIG. 10 is a diagram which illustrates an example of a job status confirmation screen to be displayed on a liquid crystal operation panel of the image forming apparatus according to the third embodiment.

FIG. 10 is a diagram which illustrates an example of a job status confirmation screen to be displayed on the liquid crystal operation panel 903 of the image forming apparatus 10.

In the example illustrated in FIG. 10, three print jobs (jobs 1001, 1002 and 1003) are displayed as the print jobs input in the image forming apparatus 10.

Each print job includes a time of day when the job was input to the image forming apparatus 10, a job name (e.g., a document name to which printing was instructed through the PC 15), a user name of the user who executed the job, a status of the job, an elapsed time from the time and day when the job was input, and the like.

In the example illustrated in FIG. 10, the status of the job 1001 corresponds to "COMPLETION" indicating that the execution has been completed, and the status of each of the jobs 1002 and 1003 corresponds to "WAITING DUE TO ELECTRICITY CHARGE" indicating that the image forming apparatus is waiting to execute the job by reason that the electricity charge 200 is higher than the allowable electricity charge 201.

Moreover, the account information for the user who has been authenticated by the user authentication using the card reader 904 is associated with the information of each print job.

In FIG. 10, for example, a case where the print job of the user who has been authenticated by the user authentication using the card reader 904 is the job 1002 will be described. In other words, a case where "User B" has been authenticated will be described.

In the case where the job 1002 is the print job of the user who has been previously permitted to use the priority print configuration by the administrator of the image forming apparatus 10, a display key of execution start 1004 and a display key of cancel 1005 are selectable on the liquid crystal operation panel 903.

The display key of execution start 1004 is used to accept an execution instruction of the print job for which the image forming apparatus has been waiting because the electricity charge is high. The display key of cancel 1005 is used to accept a cancellation instruction of the print job for which the image forming apparatus has been waiting because the electricity charge is high.

On the other hand, in regard to a job which is not associated with the authenticated user (User B) or the print job of a user who has not been permitted to use the priority print configuration by the administrator of the image forming apparatus 10, the display keys are displayed in a non-selectable gray-out state such as a display key of execution start 1006 and a display key of cancel 1007. Incidentally, since the display key of execution start 1006 is unselectable in regard to the print job of the user who has not been permitted to use the priority print configuration by the administrator of the image forming apparatus 10, the display key of cancel 1005 may be made selectable.

When the display key of execution start 1004 or 1006 on the liquid crystal operation panel 903 is pressed and selected by the user, the CPU 301 of the image forming apparatus 10 starts to execute the job for which the image forming apparatus has been waiting and which is associated with the selected display key.

Moreover, when the display key of cancel 1005 or 1007 on the liquid crystal operation panel 903 is pressed and selected by the user, the CPU 301 of the image forming apparatus 10 cancels the execution of the job for which the image forming apparatus has been waiting and which is associated with the selected display key, and deletes it from the job queue in the image forming apparatus 10.

When a display key of OK 1008 is pressed and selected by the user, the CPU 301 of the image forming apparatus 10 closes the job status confirmation screen.

As just described, in the present embodiment, even after the print job was issued, it is possible for the user to immediately start to execute the normal print job for which the image forming apparatus has been waiting because the electricity charge 200 is higher than the allowable electricity charge 201, in response to the instruction from the operation unit 12 of the image forming apparatus 10.

Moreover, the CPU 301 of the image forming apparatus 10 controls to restrict the user who can instruct from the operation unit 12 of the image forming apparatus 10 to execute the print job for which the image forming apparatus 10 has been waiting, to only the user who has been previously permitted to use the priority print configuration by the administrator of the image forming apparatus 10.

Therefore, in the image forming apparatus 10, it is possible, by controlling the permission of the priority print configuration by a user or a group, to execute the print job of a user who aims at certain execution thereof without waiting of the relevant user, and also to prevent that the priority print job is randomly used.

As just described, according to the embodiments of the present invention, it is possible to improve the user's convenience by, while keeping the electricity charge necessary for the printing low by executing the print job under the condition of the low electricity charge, executing the print job for the user who aims at the certain execution thereof without waiting until the time of the low unit price of the electricity charge. Thus, according to the present invention, it is possible to achieve both the saving of the electricity charges and the user's convenience.

Incidentally, the configurations and the contents of various data as described above are not limited to those described in the present embodiment. Namely, it is needless to say that various data are generated and managed with various configurations and contents according to uses and purposes.

As described above, the embodiments of the present invention haves been described. However, the present invention can be carried out as an embodiment of, e.g., a system, an apparatus, a method, a program, a storage medium or the like. More specifically, the present invention may be applied to a system consisting of a plurality of devices, or to an apparatus comprising a single device.

Moreover, it should be noted that constitutions made by properly combining the above embodiments are all included in the present invention.

Other Embodiments

Incidentally, it is possible to achieve the present invention by executing such a process as below. That is, in this process, software (programs) for achieving the functions of the above embodiments is supplied to a system or an apparatus through a network or various storage media, and then a computer (e.g., a CPU, an MPU or the like) of the system or the apparatus reads and executes the supplied programs.

Moreover, the present invention may be applied to a system consisting of a plurality of devices, or to an apparatus comprising a single device.

The present invention is not limited to the above embodiments. Namely, various modifications (including organic combinations of the respective embodiments) can be achieved based on the point of the present invention, and the relevant modifications are not excluded from the concept of the present invention. That is, all the constitutions which are obtained by combining the above embodiments and the modifications thereof with others are included in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-246062, filed Nov. 8, 2012, which is hereby incorporated by reference herein in its entirety.

What is claimed is:

1. An image forming apparatus comprising:
an acquisition unit configured to acquire information related to a unit price of an electricity charge, from an external device connected through a network;
a control unit configured to restrict execution of an input print job based on the information acquired by the acquisition unit; and
an execution instruction unit configured to accept an instruction for execution of the input print job,
wherein, in a case where the execution of the input print job is restricted based on the information related to the unit price of the electricity charge, (A) if the input print job is a first print job which has been configured to be executed on a priority basis, the control unit executes the first print job, and (B) if the input print job is a second print job which has not been configured to be executed on a priority basis, the control unit restricts the execution of the second print job, and
wherein the control unit executes the print job to which the instruction for execution is accepted by the execution instruction unit, even in the case where the execution of the input print job is restricted based on the information related to the unit price of the electricity charge.

2. The image forming apparatus according to claim 1, wherein the control unit executes the first print job prior to the second print job which was accepted prior to the first print job.

3. The image forming apparatus according to claim 1, further comprising a user setting unit configured to set a user who is permitted to execute the print job on a priority basis.

4. The image forming apparatus according to claim 1, further comprising a cancel instruction unit configured to accept an instruction for cancelling the input print job,
wherein the control unit cancels the print job to which the cancellation has been instructed by the cancel instruction unit.

5. The image forming apparatus according to claim 1, wherein, in the case where the execution of the input print job is restricted based on the information related to the electricity charge, the control unit restricts the execution of the second print job after generating bitmap data based on data described by a page description language included in the second print job.

6. The image forming apparatus according to claim 3, wherein the execution instruction unit is configured to allow the user who is permitted to execute the print job on a priority basis set by the user setting unit to input the instruction for executing the second print job which has been restricted.

7. A control method of an image forming apparatus, the method comprising:
an acquisition step of causing an acquisition unit to acquire information related to a unit price of an electricity charge, from an external device connected through a network;
a control step of causing a control unit to restrict execution of an input print job based on the information acquired in the acquisition step: and
an execution instruction step of causing an execution instruction unit to accept an instruction for execution of the input print job,
wherein, in a case where the execution of the input print job is restricted based on the information related to the unit price of the electricity charge, (A) if the input print job is a first print job which has been configured to be executed on a priority basis, the control step causes the control unit to execute the first print job, and (B) if the input print job is a second print job which has not been configured to be executed on a priority basis, the control step causes the control unit to restrict the execution of the second print job, and
wherein the control step causes the control unit to execute the print job to which the instruction for execution was accepted in the execution instruction step, even in the case where the execution of the input print job is restricted based on the information related to the unit price of the electricity charge.

8. The method according to claim 7 further comprising a user setting step of setting a user who is permitted to execute the print job on a priority basis,
wherein the execution instruction step is configured to allow the user who is permitted to execute the print job on a priority basis set by the user setting step to input the instruction for executing the second print job which has been restricted.

9. A non-transitory computer-readable storage medium storing program for causing a computer to perform a control method of an image forming apparatus as described in claim 7.

10. An information processing apparatus which can communicate with an image forming apparatus in which execution of an input print job is restricted based on received information related to a unit price of an electricity charge, the information processing apparatus comprising:
a processor; and
a memory storing computer executable code that, when executed by the processor, performs:
setting priority to the print job to be transmitted to the image forming apparatus; and
transmitting, to the image forming apparatus, the
print job for causing the image forming apparatus to execute printing,
wherein, in the image forming apparatus in which the execution of the input print job is restricted based on the received information related to the unit price of the electricity charge, the execution of the a print job to which the priority has not been set by the setting unit is restricted, and the execution of the print job to which the priority has been set is not restricted, and
wherein, even in the case where execution of the print job to which the priority has not been set is restricted, if an instruction is accepted by an execution instruction unit of the image forming apparatus for execution of the print job, the execution of the print job for which the execution is instructed is executed.

* * * * *